United States Patent [19]

Skinner

[11] 4,051,734
[45] Oct. 4, 1977

[54] G-METER

[76] Inventor: Reginald R. Skinner, 2511 Wiggins Ave., Saskatoon, Saskatchewan, Canada

[21] Appl. No.: 693,211

[22] Filed: June 4, 1976

[51] Int. Cl.² .............................................. G01P 15/02
[52] U.S. Cl. .................................................... 73/514
[58] Field of Search .................... 73/492, 514–517; 33/391, 401

[56] References Cited

U.S. PATENT DOCUMENTS

| | | | |
|---|---|---|---|
| 2,139,694 | 12/1938 | Reid et al. | 73/514 X |
| 2,262,008 | 11/1941 | Kollsman | 73/514 X |
| 2,598,552 | 5/1952 | Jansen | 73/515 |
| 3,318,157 | 5/1967 | Browning et al. | 73/492 |
| 3,867,844 | 2/1975 | Shimizu et al. | 73/517 R |

FOREIGN PATENT DOCUMENTS

| | | | |
|---|---|---|---|
| 1,393,451 | 5/1975 | United Kingdom | 33/401 |

*Primary Examiner*—James J. Gill
*Attorney, Agent, or Firm*—Allen D. Brufsky

[57] ABSTRACT

A meter for measuring the acceleration and deceleration of an object in "G" including a pendulum having a weight at one end and a pointer at the other end associated with a fixed scale. The pendulum is calibrated and adjusted relative to its rest position on the scale so that when put in motion or when stopped will indicate the acceleration or deceleration of the object on the scale.

5 Claims, 6 Drawing Figures

G-METER

BACKGROUND OF THE INVENTION

This invention relates to a device for measuring the acceleration of an object.

The unit of measurement of acceleration is a "G" or the force necessary to overcome the attraction of gravity on an object. This force is directly proportional to the mass of the object which in turn is a function of its moment of inertia. This invention relates to a meter for measuring this force which will indicate the acceleration of the object.

SUMMARY OF THE INVENTION

In accordance with the invention, the meter comprises a pendulum with a weight or mass at one end and a pointer at its other end. A calibrated scale is provided in conjunction with the pointer, the scale being calibrated in "G" readings for the known mass or weight on the other end of the pointer. Means, such as springs, are connected to the pendulum for adjusting the pointer to "O" reading on the scale corresponding to its rest position. When the meter is placed in an object which is accelerated, the force necessary to overcome the inertia of the mass which is proportional to the acceleration of the object, will be indicated on the scale in a "G" reading as the pendulum swings or is put in motion. As the acceleration of the object approaches "O", the pendulum will return to its calibrated rest position until the object decelerates, which will also be indicated on the scale by a reverse swing of the pendulum, as the pendulum once in motion, will tend to continue until the force of attraction of gravity returns it to its calibrated rest position.

BRIEF DESCRIPTION OF THE DRAWING

Further objects and advantages of the invention will become apparent from the following description and claims, and from the accompanying drawings, wherein:

DETAILED DESCRIPTION OF THE PREFERRED EMBODIMENT

Figure 1:
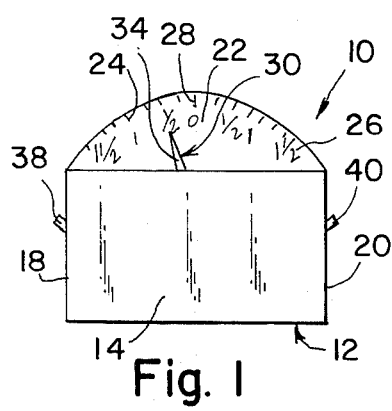
FIG. 1 is a front view in elevation of the meter of the present invention.
Figure 2:
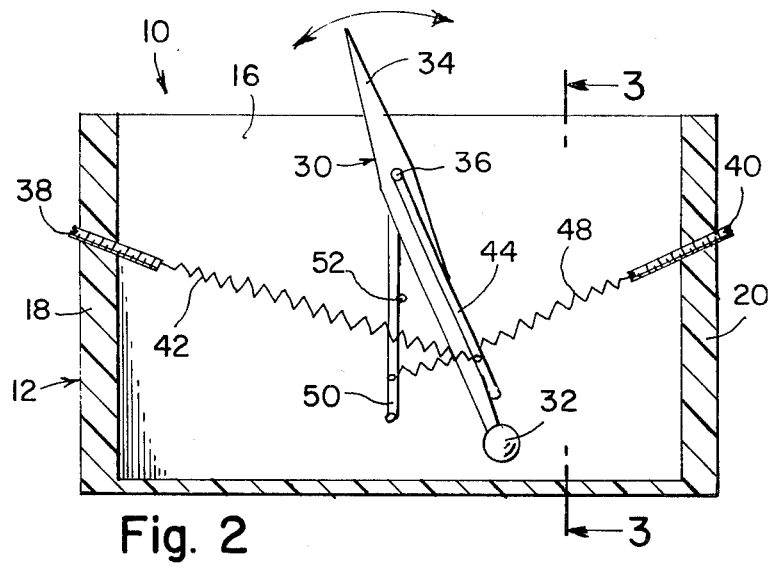
FIG. 2 is a longitudinal cross section of the meter of FIG. 1 with the scale and its support dome removed for purposes of illustration.
Figure 3:
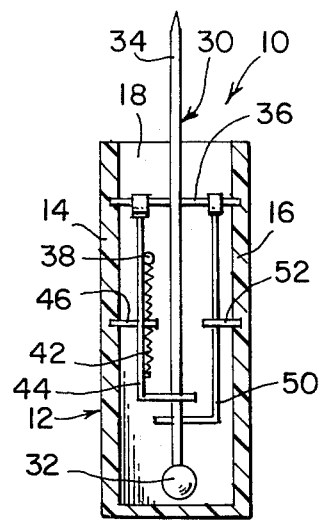
FIG. 3 is a cross sectional view taken substantially along the plane indicated by line 3—3 of FIG. 2.
Figure 4:
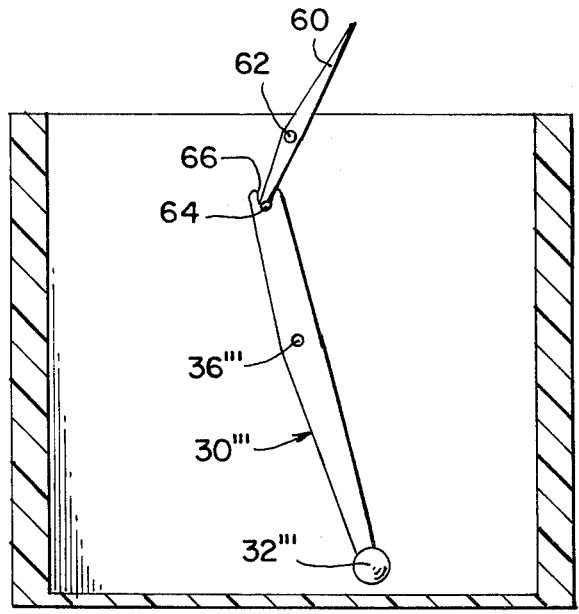
FIG. 4 is a view similar to FIG. 2, but illustrating a modified form of the meter.

Referring now to the drawing in detail, wherein like numerals indicate like elements throughout the several views, one form of the meter 10 of the present invention is illustrated in FIGS. 1 to 3.

Meter 10 includes a case 12 having front and back walls 14 and 16 and opposite end walls 18 and 20. A clear plastic dome 2 provided with a scale 24 on one surface thereof is adapted to be removably attached in seated relation to the top surfaces of walls 14–20, inclusive. Scale 24 contains indicia 26 representing "G" readings on both sides of a "O" reference indicum 28.

A pendulum 30 with a weight or mass 32 on one end thereof and a pointer 34 at the other end is pivotally mounted on a fixed axle 36 between front and back walls 14 and 16 of case 12. Pointer 34 extends above case 12, as shown in FIG. 1 so as to point to one of the indicia 26. Initially, pointer 34 is adjusted so that when pendulum 30 is at rest, the pointer 34 is in line with the "O" reference indicum 28. This is accomplished by a pair of adjustment screws 38 and 40 threadedly received through end walls 18 and 20, respectively.

Adjustment screw 38 is connected to a light spring 42. Spring 42 is in turn connected to an L-shaped spring bar 44 whose longer leg is pivotally mounted on fixed axle 36. In its vertical position, spring bar 44 is in contact with a pin stop 46 fixed to front wall 14 of case 12. Similarly, adjustment screw 40 is connected to a light spring 48. Spring 48 is in turn connected to a second L-shaped spring bar 50, whose longer leg is pivotally mounted on fixed axle 36 on the other side of pendulum 30. In its vertical position, spring bar 50 is in contact with a pin stop 52 fixed to back wall 16 of case 12.

By turning either or both adjustment screws 38 or 40, the shorter leg of spring bar 44 and/or 50 will contact pendulum 30 to bring it to a vertical rest position so that pointer 34 is aligned with "O" reference indicum 28. This occurs when the longer legs of each bar 44 and 50 abut its respective stop 46 and 52 respectively.

Scale 24 is calibrated in "G" readings on both sides of "O" reference indicum 38 for the known mass of weight 32 on pendulum 30 taking into account the force exerted by each spring 42 and 48 on pendulum 30 when elongated.

When the meter 10 is placed in an object which is accelerated, the force necessary to overcome the inertia of mass 32 in "G", which is proportional to the acceleration of the object, will be indicated by the pointer 34 on one of the indicia 26 on the left hand side of scale 24, as the pendulum 30 swings or is put in motion to the right as shown in FIG. 2. As the acceleration of the object approaches "O", pendulum 30 will return to its calibrated rest position by the shorter leg of spring bar 44 which moves with pendulum 30 against the force of spring 42. When the object decelerates, the pendulum 30 which tends to continue in motion will swing to the left in FIG. 2, and pointer 34 will indicate the deceleration "G" force on the right hand side of the scale 24. When the object comes to rest, spring 48 and bar 50 will aid in the return of pendulum 30 to its rest position at "O" reference indicum 28.

Figure 5:
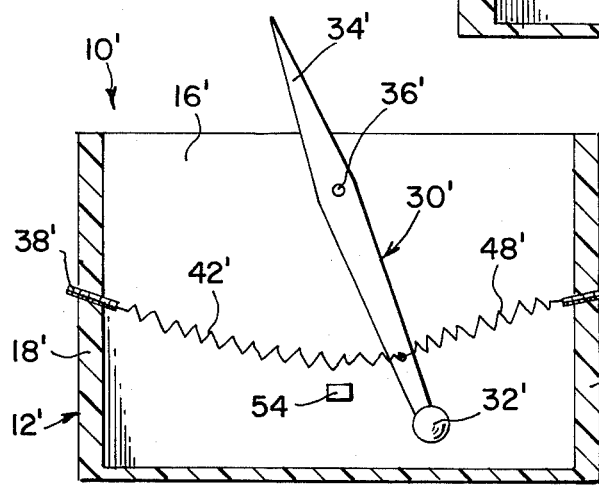
FIG. 5 is a view similar to FIG. 2, but illustrating another modified form of the meter.

In FIG. 5, the identical construction is illustrated, except springs 42' and 48' are connected directly to pendulum 30' pivotal on axle 36'. Spring bars 44 and 50 and their associated stops are eliminated, and a magnet 54 is supported on back wall 16' to attract magnetic pendulum 30' to its rest position. Fine adjustments are accomplished by adjustments screws 38' and 40' connected to springs 42' and 48' respectively.

Figure 6:
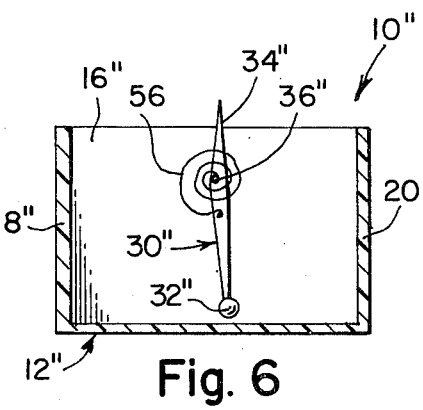
FIG. 6 is a view similar to FIG. 2, but illustrating still another modified form of the meter.

In the embodiment of FIG. 6, a finely calibrated coil spring 56 has one end connected to axle 36" and its other end connected to pendulum 30" to maintain pointer 34" at "O" reference when pendulum 30" is at rest.

If finer adjustments are required in any of the embodiments of FIGS. 2, 5 and 6, pendulum 30, 30' or 30", can be formed in two parts. A main pendulum part 30''' containing a weight 32''' at one end is pivotally mounted on fixed axle 36'''. However, pointer 34, 34' or 34" is replaced by a separate pointer 60 pivotally mounted on a fixed axle 62. Pointer 60 has a pin 64 on its lower end rotatably received in a depression or groove 66 on the top of pendulum 30'''. Because of the shorter lever arm of pointer 60, greater movement in a reverse direction is imparted to pointer 60 by pendulum 30''' through the pin and groove connection, resulting in an expanded scale 24 being used for finer readings. Of course, the scale is read in the opposite direction than that shown in FIG. 1 for acceleration and deceleration readings.

I claim:

1. A device for measuring the acceleration and deceleration of an object comprising:
    a case;
    a transparent dome on said case having a "G" scale associated therewith;
    a pendulum pivotally mounted in said case having a weight on one end thereof and a pointer on the other end thereof adjacent said scale; and
    means carried by said case for adjusting the rest position of said pendulum relative to a fixed position on said scale,
    said adjustment means comprising:
    screw means on said case; and
    spring means between said screw means and pendulum,
    said spring means including
    an L-shaped bar whose longer leg is pivotally connected to said case and whose shorter leg is adapted to abut said pendulum;
    a top in said case limiting movement of said L-shaped bar to a vertical position in said case; and
    a spring between said screw means and L-shaped bar.

2. A device in accordance with claim 1, wherein said spring means is a coil spring.

3. A device in accordance with claim 1, wherein said adjustment means further comprises a magnet mounted in said case.

4. A device in accordance with claim 1, wherein said pointer is pivotally mounted on said pendulum.

5. A device in accordance with claim 4, wherein said pendulum is longer than said pointer.

* * * * *